United States Patent [19]

Lyakhevich et al.

[11] 4,384,150
[45] May 17, 1983

[54] METHOD OF MAKING EITHER A SOFTENER FOR RUBBER MIXTURES OR A FURNACE FUEL OIL

[76] Inventors: Genrikh D. Lyakhevich, ulitsa Matusevicha, 3, kv. 146; Alexandr E. Sokolovsky, ulitsa Olshevskogo, 33, korpus 1, kv. 67, both of, Minsk; Vasily G. Suzansky, ulitsa Gorkogo, 28, kv. 33; Vulf P. Kovalerchik, ulitsa Oktyabrskaya, 197, kv. 78, both of, Bobruisk, all of U.S.S.R.

[21] Appl. No.: 294,607

[22] Filed: Aug. 20, 1981

[51] Int. Cl.$^3$ ............................ C07C 3/08; C07C 3/26
[52] U.S. Cl. .................................... 585/241; 521/44.5
[58] Field of Search ................. 260/2.3; 585/240, 241; 521/41, 44.5

[56] References Cited

U.S. PATENT DOCUMENTS

| | | | |
|---|---|---|---|
| 2,447,732 | 8/1948 | Campbell et al. | 585/241 |
| 3,704,108 | 11/1972 | Alpert | 585/241 |
| 3,985,820 | 10/1976 | Albright et al. | 585/241 |
| 4,118,281 | 10/1978 | Yan | 260/2.3 |
| 4,171,345 | 10/1979 | Toshev et al. | 585/241 |
| 4,175,211 | 11/1979 | Chen et al. | 585/241 |
| 4,251,500 | 2/1981 | Morita et al. | 585/241 |

FOREIGN PATENT DOCUMENTS

| | | | |
|---|---|---|---|
| 106402 | 2/1963 | Czechoslovakia . | |
| 50-39303 | 4/1975 | Japan | 585/240 |

*Primary Examiner*—Allan Lieberman
*Attorney, Agent, or Firm*—Ladas & Parry

[57] ABSTRACT

A method of making either a softener for rubber mixtures or a furnace fuel oil comprises the steps of heating a hydrocarbonaceous solvent and introducing thereinto waste from vulcanized or nonvulcanized rubbers under intensive stirring. Then the waste is thermally decomposed at a pressure of $5 \cdot 10^2$ to $25 \cdot 10^5 \text{n/m}^2$, the hydrocarbonaceous solvent continuously circulating through the reaction mixture. The end product is separated from the formed suspension by distillation at a temperature of 200° to 560° C. and at a pressure of 10 to $2 \cdot 10^5 \text{ n/m}^2$ in the presence of an inert gaseous agent.

6 Claims, No Drawings

METHOD OF MAKING EITHER A SOFTENER FOR RUBBER MIXTURES OR A FURNACE FUEL OIL

BACKGROUND OF THE INVENTION

1. Field of the Invention

The present invention relates to chemical production procedures and more particularly to methods of making either softeners for rubber mixtures or furnace fuel oils.

2. Description of the Prior Art

Widely used at present are methods of making either softeners for rubber mixtures or a furnace fuel oil as described in "N. I. Chernozhukov, Tekhnologia pererabotki nefti i gaza, Khimia Publishers, Moscow, 1967, pp. 133–140". The furnace fuel oil is made by mixing the residue of thermal cracking and coking processes, and the softeners are extracted with the aid of such solvents as phenol, furfural. Decreased supplies and increased costs of crude oil make it necessary to look for other sources of raw materials for making the above materials.

In particular, a production procedure was developed for making either a softener for rubber mixtures or a furnace fuel oil, comprising a thermal decomposition of vulcanized rubbers under heating in a medium of a hydrocarbonaceous solvent and a subsequent separation of the end product as described in Czechoslovak Pat. No. 106,402. It is quite obvious that used as a source material in this method is a waste rubber material. An advantage of the above production procedure consists in that, apart from the utilization of the waste material, it allows the cost of the end products to be greatly reduced.

However, this method also suffers from some substantial disadvantages. In particular, the quality of the produced softener and the furnace fuel oil is not always satisfactory, which is due to the fact that in the course of heating to the decomposition temperature a portion of the source material is locally overheated. The overheating causes coking and impairs the quality of the end product. Another disadvantage of the above production procedure consists in that the rubber mixtures (vulcanizates) produced with the aid of the obtained softener possess unsatisfactory characteristics and have high congelation temperatures.

The object of the present invention is to provide a method of making either a softener for rubber mixtures or a furnace fuel oil, wherein the conditions for the thermal decomposition and the technique of separation of the end products make it possible to preclude the coking of the source material and thus to upgrade the quality of the softener for rubber mixtures or the furnace fuel oil.

SUMMARY OF THE INVENTION

The principal object of the present invention is to provide a method of making either a softener for rubber mixtures or a furnace fuel oil, which makes it possible to upgrade the quality of the end products when processing polymeric materials.

Another object of the invention is to improve the viscosity and temperature characteristics of the rubber mixtures.

One more object of the invention is to provide a method of making a softener, which makes it possible to reduce the congelation temperature of the rubber mixtures.

An additional object of the invention is to intensify the process and to increase the productivity in the course of making the furnace fuel oil or the softener when processing waste from polymeric materials.

These and other objects of the present invention are attained in a method of making either a softener for rubber mixtures or a furnace fuel oil, comprising a thermal decomposition of a raw material from polymeric materials under heating in a medium of a hydrocarbonaceous solvent and a subsequent separation of the end product, wherein, according to the invention, the hydrocarbonaceous solvent is preheated, then waste from vulcanized or nonvulcanized rubbers are added thereto under intensive stirring, the thermal decomposition of the waste is accomplished at a pressure of $5 \cdot 10^2$ to $25 \cdot 10^5$ $n/m^2$, said hydrocarbonaceous solvent continuously circulating through the reaction mixture, and the end product is separated from the formed suspension by distillation at a temperature of 200° to 560° C. and at a pressure of 10 to $2 \cdot 10^5$ $n/m^2$ in the presence of an inert gaseous agent.

The preheating of the hydrocarbonaceous solvent and the intensive circulation of the latter in the reaction mixture as well as the compliance with the above conditions of the thermal decomposition and distillation make it possible to considerably upgrade the quality of the end products and to preclude the coking of the raw material. There occurs a sharp improvement in the properties of the rubber mixtures (vulcanizates) produced with the aid of the thus obtained softener. In particular, the method of the present invention makes it possible to reduce the congelation temperature of the rubber mixtures and to improve their viscosity and temperature characteristics. It is to be noted that the distinguishing features of the method allow the process to be accomplished more intensively as compared to conventional ones, which is assisted by both the circulation of the heated hydrocarbonaceous solvent and the addition of the inert gaseous agent.

It is advisable that the hydrocarbonaceous solvent be heated up to a temperature of 150° to 600° C. To step up the efficiency of the process, the thermal decomposition of the waste materials from vulcanized and nonvulcanized rubbers should preferably be carried out within 1 to 300 sec. It is expedient that the waste materials from vulcanized and nonvulcanized rubbers be mixed with said hydrocarbonaceous solvent in a ratio of 1:1 to 1:100 parts by mass. The above range is the most suitable for attaining good results, such as a higher quality of the product, a shorter duration time of the process, lower power expenditures etc.

It is preferable that in the course of the thermal decomposition the hydrocarbonaceous solvent should circulate through the reaction mixture in an amount of 1 to 30 l/hr per 1 kg of waste from vulcanized or nonvulcanized rubbers. This modification of the method provides better conditions for the thermal decomposition of the raw material and thus allows it to be accomplished to a higher extent.

It is feasible to use as the inert gaseous agent nitrogen, steam, stack gases, methane, ethane, propane, hydrocarbonaceous $C_3$–$C_6$ fraction or mixtures thereof. The above gaseous agents are comparatively cheap, widely distributed in nature and easy to produce.

It is advisable that in the course of the distillation the inert gaseous agent should be continuously added at a rate of 0.01 to 90 l/hr 1 kg of the suspension. Such conditions provide for a better removal of sulfur dioxide and at the same time provide for a sufficient intensity of the process.

In the modification of the method, intended mainly for the production of a furnace fuel oil the distillation process should preferably be carried out at a temperature of 250° to 560° C. and at a pressure of 10 to $1 \cdot 10^5$ n/m². Such conditions provide, in addition to a high-quality of the product, for both a high quality and a maximum output of the end product. In this same modification of the method it is advisable that in the course of the thermal decomposition of waste said hydrocarbonaceous solvent be oil fractions, coke chemical fractions, and a furnace fuel oil obtained as a result of said distillation, containing from 0.1 to 100% by mass of aromatic hydrocarbons and resins.

In the modification of the method, intended mainly for the production of a softener, it is advisable that the thermal decomposition be carried out at a temperature of 200° to 400° C. and at a pressure of $1 \cdot 10^5$ to $4 \cdot 10^5$ n/m², and in the distillation process the temperature be maintained within the range of 200° to 400° C. and at a pressure of $1 \cdot 10^3$ to $2 \cdot 10^5$ n/m².

DETAILED DESCRIPTION OF THE INVENTION

Now the invention will be described with reference to the detailed description of the method as well as of specific examples thereof.

A method of making either a softener for rubber mixtures or a furnace fuel oil is carried out in the following way. According to the invention a hydrocarbonaceous solvent is preheated to a temperature of 150° to 600° C. Used as the hydrocarbonaceous solvent may be oil fractions having a boiling temperature of 40° to 120° C., 50° to 250° C., 250° to 400° C. and 200° to 500° C., a coke-chemical fraction having a boiling temperature of 320° to 535° C., and a furnace fuel oil produced according to the method of the present invention.

The heated hydrocarbonaceous solvent is mixed with the waste from vulcanized or nonvulcanized rubbers under intensive stirring.

Used as raw materials may be worn tires, waste of rubber products as well as waste based on butadiene, isoprene, butadiene-styrene, ethylene-propylene, acryl, carboxylated, butadiene-methylstyrene and butadiene-nitrile rubbers.

Such being the case, waste from vulcanized or nonvulcanized rubbers is mixed with said hydrocarbonaceous solvent in a ratio of 1:1 to 1:100 parts by mass.

The obtained mixture is thermally decomposed at a temperature of 150° to 485° C. and at a pressure of $5 \cdot 10^2$ to $25 \cdot 10^5$ n/m² for 1 to 300 sec until said waste is completely dissolved and a suspension is obtained.

It is to be noted that if a softener for rubber mixtures is to be produced, the thermal decomposition process is carried out at a temperature of 200° to 400° C. and at a pressure of $1 \cdot 10^5$ to $4 \cdot 10^5$ n/m².

In the course of the thermal decomposition the hydrocarbonaceous solvent continuously circulates through the reaction mixture in an amount of 1 to 30 l/hr per 1 kg of the waste from vulcanized or nonvulcanized rubbers.

The end product is separated from the formed suspension by distillation at a temperature of 200° to 560° C. and at a pressure of 10 to $2 \cdot 10^5$ n/m² in the presence of an inert gaseous agent.

Used as the inert gaseous agent may be nitrogen, steam, carbon dioxide, stack gases, methane, ethane, propane, hydrocarbonaceous $C_3$–$C_6$ fraction and mixtures thereof. In the course of the distillation process the gaseous agent is continuously fed at a rate of 0.01 to 90 l/hr per 1 kg of suspension.

It is to be noted that when producing a furnace fuel oil the distillation process is carried out at a temperature of 250° to 560° C. and at a pressure of 10 to $1 \cdot 10^5$ n/m². When producing a softener for rubber mixtures the distillation process is carried out at a temperature of 200° to 400° C. and at a pressure of $1 \cdot 10^3$ to $2 \cdot 10^5$ n/m².

EXAMPLE 1

According to the invention a furnace fuel oil was produced from old tires (materials based on ethylene-propylene, butylene rubber). For this purpose a hydrocarbonaceous solvent was preliminarily heated up to a temperature of 362° C. The hydrocarbonaceous solvent (a coke-chemical fraction having a boiling temperature of 335° to 502° C.) had the following characteristics:

| | |
|---|---|
| density at a temperature of 20° C., g/cm³ | 0.9594 |
| index of refraction 20 | 1.5671 |
| Engler viscosity at a temperature of 50° C., °E. | 7.6 |
| content of sulphur, % by mass | 1.57 |
| molecular mass | 357 |
| distillation fractions, °C. | |
| beginning of boiling | 335.5 |
| 50% boils away | 452 |
| end of boiling | 502 |
| group chemical composition, % by mass: | |
| methano-naphthenic hydrocarbons | 12.5 |
| monocyclic aromatic hydrocarbons | 10.1 |
| bicyclic aromatic hydrocarbons | 32.7 |
| polycyclic aromatic hydrocarbons | 42.8 |
| resins | 1.9 |

The heated hydrocarbonaceous solvent was mixed with the above waste. The ratio between the waste and the hydrocarbonaceous solvent in the reaction mixture was 1:10 parts by mass. The thermal decomposition process was carried out for 290 sec at a temperature of 362° C. at a pressure of $4.5 \cdot 10^5$ n/m², the hydrocarbonaceous solvent circulating through the reaction mixture at a rate of 7 l/hr per 1 kg of the waste. From the obtained suspension the furnace fuel oil was separated by distillation at a temperature of 356° C. and at a pressure of $5 \cdot 10^4$ n/m². In the course of the distillation process the remainder of sulphur dioxide was removed by a gaseous agent, namely steam. The consumption of the steam was 9 l/hr per 1 kg of the suspension.

The obtained furnace fuel oil had the following characteristics:

| | |
|---|---|
| density at a temperature of 20° C., g/cm³ | 0.9624 |
| Engler viscosity at a temperature of 50° C., °E. | 8.65 |
| ash content, % by mass | 0.05 |
| content of mechanical admixtures, % by mass | 0.03 |
| flash point (in a closed crucible), °C. | 98 |
| heat of combustion (lower value calculated as dry fuel), kcal/kg | 9845 |

The above data prove that the produced furnace fuel oil has such characteristics which are similar to those of mazuts. However, the cost of the produced furnace fuel oil is lower than that of the mazuts.

EXAMPLE 2

The furnace fuel oil according to the invention was produced substantially as described in Example 1, using the same hydrocarbonaceous solvent. Used as the raw material was waste based on butadiene-styrene isoprene rubber.

The conditions of the thermal decomposition were the following:

| | |
|---|---|
| ratio between the raw material and the hydrocarbonaceous solvent, parts by mass | 1:10.2 |
| temperature, °C. | 362 |
| pressure, $n/m^2$ | $4.5 \cdot 10^5$ |
| time, sec | 300 |

The hydrocarbonaceous solvent intensively circulated through the reaction mixture at a rate of 5 l/hr per 1 kg of the waste.

The distillation process was carried out with the aid of steam used as the hydrocarbonaceous agent at a temperature of 356° C. and at a pressure of $5 \cdot 10^4 \, n/m^2$. The rate of the steam was 9.0 l/hr per 1 kg of the suspension.

The characteristics of the obtained furnace fuel oil were the following:

| | |
|---|---|
| density at a temperature of 20° C., $g/cm^3$ | 0.9624 |
| Engler viscosity at a temperature of 50° C., °E. | 8.65 |
| ash content, % by mass | 0.05 |
| content of mechanical admixtures, % by mass | 0.03 |
| content of sulphur, % by mass | 1.4 |
| flash point (in a closed crucible), °C. | 98 |
| heat of combustion, kcal/kg | 9845 |

Thus, the properties and cost of the obtained furnace fuel oil were similar to those of the furnace fuel oil described in Example 1.

EXAMPLE 3

The furnace fuel oil according to the invention was produced substantially as described in Example 1 with the difference that the raw material was waste based on isoprene natural rubber, and the hydrocarbons solvent was an oil fraction having a boiling temperature of 400° C. Said hydrocarbonaceous solvent had the following characteristics:

| | |
|---|---|
| density at a temperature of 20°C., $g/cm^3$ | 0.9007 |
| index of refraction $n_D^{20}$ | 1.5204 |
| Engler viscosity at a temperature of 50°C., °E. | 1.8 |
| content of sulphur, % by mass | 1.34 |
| molecular mass | 283 |
| distillation fractions, °C. | |
| beginning of boiling | 250 |
| 50% boils away | 381 |
| end of boiling | 400 |
| group chemical composition, % by mass: | |
| methano-naphthenic hydrocarbons | 51.4 |
| monocyclic aromatic hydrocarbons | 10.5 |
| bicyclic aromatic hydrocarbons | 17.1 |
| polycyclic aromatic hydrocarbons | 20.3 |
| resins | 0.7 |

Said hydrocarbonaceous solvent was preliminarily heated to a temperature of 468° C., and the waste was mixed with the heated hydrocarbonaceous solvent in a ratio of 1:100 parts by mass. The thermal decomposition was carried out for 239 sec at a temperature of 468° C. and at a pressure of $12 \cdot 10^5 \, n/m^2$, the hydrocarbonaceous solvent circulating through the reaction mixture at a rate of 2.3 l/hr per 1 kg of the waste. The distillation was carried out utilizing ethane as an inert gaseous agent. The consumption of ethane was 6.7 l/hr per 1 kg of the suspension. The distillation was carried out at a temperature of 250° C. and at a pressure of $1.5 \cdot 10^2 \, n/m^2$.

The obtained furnace fuel oil had the following characteristics:

| | |
|---|---|
| density at a temperature of 20° C., $g/cm^3$ | 0.9701 |
| Engler viscosity at a temperature of 50° C., °E. | 20.2 |
| ash content, % by mass | 0.06 |
| content of mechanical admixtures, % by mass | 0.04 |
| content of sulphur, % by mass | 1.5 |
| flash point (in a closed crucible), °C. | 139 |
| heat of combustion, kcal/kg | 9968 |

Thus, the properties and the cost of the obtained furnace fuel oil where similar to those of the furnace fuel oil obtained as described in Example 1.

EXAMPLE 4

The furnace fuel oil according to the invention was produced substantially as described in Example 1. The raw material was waste based on butadiene-styrene rubber, and the hydrocarbonaceous solvent was an oil fraction described in Example 3.

The hydrocarbonaceous solvent was heated up to a temperature of 461° C. Then the waste was mixed with the heated hydrocarbonaceous solvent in a ratio of 1:11 parts by mass.

The conditions of the thermal decomposition were the following:

| | |
|---|---|
| temperature, °C. | 461 |
| pressure, $n/m^2$ | $8.7 \cdot 10^5$ |
| time, sec | 245 |

Such being the case, the hydrocarbonaceous solvent intensively circulated through the reaction mixture at a rate of 1.4 l/hr per 1 kg of the waste.

The distillation process was carried out using stack gases as an inert gaseous agent at a temperature of 383° C. and at a pressure of $6.7 \cdot 10^3 \, n/m^2$. The consumption of the stack gases was 1.8 l/hr per 1 kg of the suspension.

The obtained furnace fuel oil had the following characteristics:

| | |
|---|---|
| density at a temperature of 20° C., $g/cm^3$ | 0.9649 |
| Engler viscosity at a temperature of 50° C., °E. | 18.4 |
| ash content, % by mass | 0.02 |
| content, % by mass: | |
| of mechanical admixtures | 0.03 |
| of sulphur | 1.3 |
| flash point (in a closed crucible), °C. | 117 |
| heat of combustion, kcal/kg | 10412 |

Thus, the properties and the cost of the obtained furnace fuel oil were similar to those of the furnace fuel oil obtained as described in Example 1.

EXAMPLE 5

The furnace fuel oil according to the invention was produced substantially as described in Example 1 with the difference that the raw material was waste based on butadiene-nitrile rubber, and the hydrocarbonaceous solvent was an oil fraction having a boiling temperature of 200° to 500° C. Said hydrocarbonaceous solvent had the following characteristics:

| | |
|---|---|
| density at a temperature of 20° C., g/cm$^3$ | 0.9812 |
| index of refraction, n$_D^{20}$ | 1.5823 |
| Engler viscosity at a temperature of 50° C., °E. | 1.2 |
| content of sulphur, % by mass | 1.37 |
| molecular mass | 265 |
| distillation fractions, °C. | |
| beginning of boiling | 200 |
| 50% boils away | 364 |
| end of boiling | 500 |
| group chemical composition, % by mass: | |
| methano-naphthenic hydrocarbons | 9.7 |
| monocyclic aromatic hydrocarbons | 8.6 |
| bicyclic aromatic hydrocarbons | 25.8 |
| polycyclic aromatic hydrocarbons | 54.5 |
| resins | 1.4 |

Said hydrocarbonaceous solvent was heated up to a temperature of 453° C., and the waste was mixed with the heated hydrocarbonaceous solvent in a ratio of 1:11.6 parts by mass.

The thermal decomposition was carried out for 250 sec at a temperature of 453° C. and at a pressure of $9.2 \cdot 10^5$ n/m$^2$, the hydrocarbonaceous solvent intensively circulating through the reaction mixture at a rate of 1.8 l/hr per 1 kg of the waste.

The distillation process was carried out with the use of a hydrocarbonaceous C$_3$-C$_6$ fraction as an inert gaseous agent. The consumption of said hydrocarbonaceous C$_3$-C$_6$ fraction was 2.1 l/hr per 1 kg of the suspension. The distillation process was accomplished at a temperature of 432° C. and at a pressure of $2.5 \cdot 10^3$ n/m$^2$.

The obtained furnace fuel oil had the following characteristics:

| | |
|---|---|
| density at a temperature of 20° C., g/cm$^3$ | 0.9657 |
| Engler viscosity at a temperature of 50° C., °E. | 17.6 |
| ash content, % by mass | 0.04 |
| content, in % by mass: | |
| of mechanical admixtures | 0.02 |
| of sulphur | 1.7 |
| flash point (in a closed crucible), °C. | 124 |
| heat of combustion, kcal/kg | 9941 |

Thus, the properties and the cost of the obtained furnace fuel oil were similar to those of the furnace fuel oil obtained as described in Example 1.

EXAMPLE 6

The furnace fuel oil according to the invention was produced substantially as described in Example 1 with the difference that the raw material was waste based on butadiene-methylstyrene acryl rubber, and the hydrocarbonaceous solvent was a coke-chemical fraction having a boiling temperature of 320° to 535° C. Said hydrocarbonaceous solvent had the following characteristics:

| | |
|---|---|
| density at a temperature of 20° C., g/cm$^3$ | 1.1204 |
| index of reflection, n$_D^{20}$ | 1.6095 |
| Engler viscosity at a temperature of 50° C., °E. | 2.3 |
| content of sulphur, % by mass | 0.38 |
| molecular mass | 275 |
| distillation fractions, °C. | |
| beginning of boiling | 320 |
| 50% boils away | 447 |
| end of boiling | 535 |
| group chemical composition, % by mass: | |
| methano-naphthenic hydrocarbons | 0 |
| monocyclic aromatic hydrocarbons | 13.5 |
| bicyclic aromatic hydrocarbons | 31.3 |
| polycyclic aromatic hydrocarbons | 50.9 |
| resins | 4.3 |

Said hydrocarbonaceous solvent was heated up to a temperature of 600° C., and the waste was mixed with the heated hydrocarbonaceous solvent in a ratio of 1:11.4 parts by mass.

The thermal decomposition was carried out at a temperature of 600° C. and at a pressure of $8.3 \cdot 10^5$ n/m$^2$ with the use of stack gases as an inert gaseous agent. The consumption of the stack gases was 90 l/hr per 1 kg of the suspension.

The obtained furnace fuel oil had the following characteristics:

| | |
|---|---|
| density at a temperature of 20° C., g/cm$^3$ | 1.0017 |
| Engler viscosity at a temperature of 50° C., °E. | 40.2 |
| ash content, % by mass | 0.09 |
| content, % by mass: | |
| of mechanical admixtures | 0.1 |
| of sulphur | 0.3 |
| flash point (in a closed crucible), °C. | 139 |
| heat of combustion, kcal/kg | 9894 |

Thus, the properties and the cost of the obtained furnace fuel oil were similar to those of the furnace fuel oil obtained as described in Example 1.

EXAMPLE 7

The furnace fuel oil according to the invention was produced substantially as described in Example 1 with the difference that the raw material was waste based on ethylenepropylene acryl rubber, and the hydrocarbonaceous solvent was an oil fraction having a boiling temperature of 40° to 120° C. Said hydrocarbonaceous solvent had the following characteristics:

| | |
|---|---|
| density at a temperature of 20° C., g/cm$^3$ | 0.6715 |
| index of refraction, n$_D^{20}$ | 1.3802 |
| Engler viscosity at a temperature of 50° C., °E. | 0.1 |
| content of sulphur, % by mass | 0.01 |
| molecular mass | 92 |
| distillation fractions, °C. | |
| beginning of boiling | 40 |
| 50% boils away | 89 |
| end of boiling | 120 |
| group chemical composition, % by mass: | |
| methano-naphthenic hydrocarbons | 99.9 |
| monocyclic aromatic hydrocarbons | 0.1 |

Said hydrocarbonaceous solvent was heated up to a temperature of 437° C., and the waste was mixed with the heated hydrocarbonaceous solvent in a ratio of 1:11 parts by mass.

The thermal decomposition was carried out for 300 sec at a temperature of 437° C. and at a pressure of $25 \cdot 10^5$ n/m$^2$, the hydrocarbonaceous solvent circulating through the reaction mixture at a rate of 1.4 l/hr per 1 kg of the waste.

The distillation process was carried out with the use of methane as an inert gaseous agent at a temperature of 325° C. and at a pressure of $7.2 \cdot 10^3$ n/m$^2$. The consumption of methane was 2.4 l/hr per 1 kg of the suspension.

The obtained furnace fuel oil had the following characteristics:

| | |
|---|---|
| density at a temperature of 20° C., g/cm³ | 0.9563 |
| Engler viscosity at a temperature of 50° C., °E. | 12.7 |
| ash content, % by mass: | |
| of mechanical admixtures | 0.02 |
| of sulphur | 1.2 |
| flash point (in a closed crucible), °C. | 93 |
| heat of combustion, kcal/kg | 10625 |

Thus, the properties and the cost of the obtained furnace fuel oil were similar to those of the furnace fuel oil obtained as described in Example 1.

EXAMPLE 8

The furnace fuel oil according to the invention was produced substantially as described in Example 1. However, the hydrocarbonaceous solvent was the furnace fuel oil of the present invention having the following characteristics:

| | |
|---|---|
| density at a temperature of 20° C., g/cm³ | 0.9736 |
| index of refraction, $n_D^{20}$ | 1.5729 |
| Engler viscosity at a temperature of 50° C., °E. | 8.4 |
| content of sulphur, % by mass | 1.25 |
| molecular mass | 342 |
| distillation fractions, °C.: | |
| beginning of boiling | 293 |
| 50% boils away | 378 |
| end of boiling | 529 |
| group chemical composition, % by mass: | |
| methano-naphthenic hydrocarbons | 41.3 |
| monocyclic aromatic hydrocarbons | 12.1 |
| bicyclic aromatic hydrocarbons | 13.4 |
| polycyclic aromatic hydrocarbons | 30.5 |
| resins | 2.7 |

Said hydrocarbonaceous solvent was heated up to a temperature of 430° C., and the waste was mixed with the heated hydrocarbonaceous solvent in a ratio of 1:11.3 parts by mass.

The thermal decomposition was carried out for 262 sec at a temperature of 430° C. and at a pressure of 7·10⁵ n/m², the hydrocarbonaceous solvent intensively circulating through the reaction mixture at a rate of 1.2 l/hr per 1 kg of the waste.

The distillation was carried out at a temperature of 284° C. and at a pressure of 10 n/m² with the use of propane as an inert gaseous agent. The consumption of propane was 0.01 l/hr per 1 kg of the suspension.

The obtained furnace fuel oil had the following characteristics:

| | |
|---|---|
| density at a temperature of 20° C., g/cm³ | 0.9962 |
| Engler viscosity at a temperature of 50° C., °E. | 27.1 |
| ash content, % by mass | 0.03 |
| content, % by mass: | |
| of mechanical admixtures | 0.04 |
| of sulphur | 1.8 |
| flash point (in a closed crucible), °C. | 95 |
| heat of combustion, kcal/kg | 10296 |

Thus, the properties and the cost of the obtained furnace fuel oil were similar to those of the furnace fuel oil obtained as described in Example 1.

EXAMPLE 9

The furnace fuel oil according to the invention was produced substantially as described in Example 1 with the only difference that the raw material was waste based on isoprene butadiene-styrene rubber.

The hydrocarbonaceous solvent was heated up to a temperature of 372° C., and the waste was mixed with the heated solvent in a ratio of 1:1 parts by mass. The thermal decomposition was carried out for 95 sec at a temperature of 372° C. and at a pressure of 8·10⁴ n/m², the hydrocarbonaceous solvent intensively circulating through the reaction mixture at a rate of 1 l/hr. The distillation process was carried out at a temperature of 410° C. and at a pressure of 5·10⁴ n/m² with the use of nitrogen as an inert gaseous agent. The consumption of nitrogen was 16 l/hr per 1 kg of the suspension.

The obtained furnace fuel oil had the following characteristics:

| | |
|---|---|
| density at a temperature of 20° C., g/cm³ | 0.9745 |
| Engler viscosity at a temperature of 50° C., °F. | 8.9 |
| ash content, % by mass | 0.05 |
| content of mechanical admixtures, % by mass | 0.05 |
| flash point (in a closed crucible), °C. | 145 |
| heat of combustion, kcal/kg | 9942 |

Thus, the properties and the cost of the obtained furnace fuel oil were similar to those of the furnace fuel oil obtained as described in Example 1.

EXAMPLE 10

The furnace fuel oil according to the invention was produced substantially as described in Example 9 using the same raw material and the same hydrocarbonaceous solvent. However, the hydrocarbonaceous solvent was preheated up to a temperature of 150° C. The waste was mixed with the heated solvent in a ratio of 1:5.9 parts by mass. The thermal decomposition was carried out for 300 sec at a temperature of 150° C. and a pressure of 5·10² n/m², the hydrocarbonaceous solvent intensively circulating through the reaction mixture at a rate of 30 l/hr per 1 kg of the waste. The distillation process was carried out at a temperature of 250° C. and at a pressure of 1·10² n/m² with the use of nitrogen as an inert gaseous agent. The consumption of nitrogen was 0.09 l/hr per 1 kg of the suspension.

The obtained furnace fuel oil had the following characteristics:

| | |
|---|---|
| density at a temperature of 20° C., g/cm³ | 0.9741 |
| Engler viscosity at a temperature of 50° C., °F. | 9.37 |
| ash content, % by mass | 0.08 |
| content of mechanical admixtures, % by mass | 0.05 |
| flash point (in closed crucible), °C. | 161 |
| heat of combustion, kcal/kg | 9913 |

Thus, the properties and the cost of the obtained furnace fuel oil were similar to those of the furnace fuel oil obtained as described in Example 1.

EXAMPLE 11 (negative)

Furnace fuel oil was produced substantially as described in Example 1 using the same raw material and the same hydrocarbonaceous solvent. However the hydrocarbonaceous solvent was preheated up to a temperature of 610° C., which is higher than the limit indicated in the claims.

The waste was mixed with the heated solvent in a ratio of 1:11.2 parts by mass. The thermal decomposition was carried out for 129 sec at a temperature of 610° C., which is higher than the maximum limit indicated in the claims and at a pressure of 26·10⁵ n/m², which is also higher than the maximum limit indicated in the claims.

This being the case, the hydrocarbonaceous solvent intensively circulated through the reaction mixture at a rate of 1.5 l/hr per 1 kg of the waste.

The distillation process was carried out with the use of nitrogen as an inert gaseous agent. The consumption of nitrogen was 95 l/hr per 1 kg of the suspension, which is higher than the maximum limit indicated in the claims. The distillation process was carried out at a temperature of 570° C. which exceeds the maximum limit indicated in the claims and at a pressure of $7.2 \cdot 10^4$ n/m².

The obtained furnace fuel oil had the following characteristics:

| | |
|---|---|
| density at a temperature of 20° C., g/cm³ | 0.9505 |
| Engler viscosity at a temperature of 50° C., °F. | 18.3 |
| ash content, % by mass | 0.2 |
| content, % by mass: | |
| of mechanical admixtures | 1.2 |
| of sulphur | 0.7 |
| flash point (in a closed crucible), °C. | 83 |
| heat of combustion, kcal/kg | 9875 |

Thus, the elevated temperatures of accomplishing the thermal decomposition and distillation cause a partial coking of the reaction mixture, which adversely affects the quality of the furnace fuel oil being produced.

EXAMPLE 12 (negative)

Furnace fuel oil was produced substantially as described in Example 4 using the same raw material and the same hydrocarbonaceous solvent. The hydrocarbonaceous solvent was preliminarily heated up to a temperature of 446° C.

The waste was mixed with the heated hydrocarbonaceous solvent in a ratio of 1:11.5 parts by mass. The thermal decomposition was carried out for 320 sec, which exceeds the maximum limit indicated in the claim, at a temperature of 446° C. and at a pressure of $8.6 \cdot 10^5$ n/m², the hydrocarbonaceous solvent intensively circulating through the reaction mixture at a rate of 2.1 l/hr per 1 kg of the waste. The distillation process was carried out with the use of steam as an inert gaseous agent. The consumption of steam was 0.005 l/hr per 1 kg of the suspension, which is less than the minimum limit indicated in the claims. The distillation process was carried out at a temperature of 395° C. and at a pressure of 5 n/m², which is also lower than the minimum limit indicated in the claims.

To obtained furnace fuel oil had the following characteristics:

| | |
|---|---|
| density at a temperature of 20° C., g/cm³ | 1.0945 |
| Engler viscosity at a temperature of 50° C., °F. | 38.6 |
| ash content, % by mass | 0.1 |
| content, % by mass: | |
| of mechanical admixtures | 0.8 |
| of sulphur | 1.9 |
| flash point (in a closed crucible), °C. | 198 |
| heat of combustion, kcal/kg | 9802 |

With the above characteristics of the furnace fuel oil the qualities thereof are greatly deteriorated. In addition, it is rather difficult to maintain the above-mentioned value of pressure in the distillation process.

EXAMPLE 13 (negative)

The furnace fuel oil was produced substantially as described in Example 4 with the use of the same raw material and the same hydrocarbonaceous solvent. The hydrocarbonaceous solvent was preliminarily heated up to a temperature of 435° C. The waste was mixed with the heated solvent in a ratio of 1:11 parts by mass. The thermal decomposition was carried out for 0.5 sec, which is lower than the minimum limit indicated in the claims and at a temperature of 435° C. and at a pressure of $9.7 \cdot 10^5$ n/m², the hydrocarbonaceous solvent intensively circulating through the reaction mixture at a rate of 1.8 l/hr per 1 kg of the waste. The distillation process was carried out with the use of steam as an inert gaseous agent. The consumption of the steam was 1.7 l/hr per 1 kg of the suspension. The distillation process was carried out at a temperature of 308° C. and at a pressure of $2.5 \cdot 10^3$ n/m².

The obtained furnace fuel oil had the following characteristics:

| | |
|---|---|
| density at a temperature of 20° C., g/cm³ | 0.9813 |
| Engler viscosity at a temperature of 50° C., °F. | 15.9 |
| ash content, % by mass | 3.9 |
| content, % by mass: | |
| of mechanical admixtures | 2.7 |
| of sulphur | 2.1 |
| flash point (in a closed crucible), °C. | 79 |
| heat of combustion, kcal/kg | 9897 |

Thus, because of the insufficient time of thermal decomposition the content of mechanical admixtures in the furnace fuel oil was too high. Also, the ash content was too high, which considerably decreased the quality of the end product.

EXAMPLE 14 (negative)

The furnace fuel oil was produced substantially as described in Example 2 using the same raw material and the same hydrocarbonaceous solvent. The hydrocarbonaceous solvent was preliminarily heated up to a temperature of 272° C. The waste was mixed with the heated solvent in a ratio of 1:0.5 parts by mass, which is lower than the minimum limit indicated in the claims. The thermal decomposition was carried out for 197 sec at a temperature of 272° C. and at a pressure of $9 \cdot 10^4$ n/m², the hydrocarbonaceous solvent intensively circulating through the reaction mixture at a rate of 12 l/hr per 1 kg of the waste. The distillation process was carried out with the use of nitrogen as an inert gaseous agent. The consumption of nitrogen was 1.9 l/hr per 1 kg of the suspension. The distillation process was accomplished at a temperature of 359° C. and at a pressure of $1.4 \cdot 10^3$ n/m².

The obtained furnace fuel oil had the following characteristics:

| | |
|---|---|
| density at a temperature of 20° C., g/cm³ | 0.9845 |
| Engler viscosity at a temperature of 50° C., °F. | 16.8 |
| ash content, % by mass | 4.3 |
| content of mechanical admixtures, % by mass | 3.1 |
| flash point (in a closed crucible), °C. | 76 |
| heat of combustion, kcal/kg | 9905 |

The above ratio between the waste and the hydrocarbonaceous solvent in the obtained furnace fuel oil causes a considerable increase in the content of mechanical admixtures as well as in an ash content, which deteriorates the quality of the end product.

In addition, there occur difficulties in carrying out the production procedure, namely in maintaining the temperature, pressure, and circulation parameters. Also, the labour consumption is rather high.

EXAMPLE 15 (negative)

The furnace fuel oil was produced substantially as described in Example 2 using the same raw material and the same hydrocarbonaceous solvent. The hydrocarbonaceous solvent was preliminarily heated up to a temperature of 264° C. The waste was mixed with the heated solvent in a ratio of 1:101 parts by mass, which exceeds the maximum limit indicated in the claims. The thermal decomposition was carried out for 204 sec at a temperature of 264° C. and at a pressure of $7 \cdot 10^4$ n/m$^2$, the hydrocarbonaceous solvent intensively circulating through the reaction mixture at a rate of 9 l/hr per 1 kg of the waste. The distillation process was carried out using nitrogen as an inert gaseous agent. The consumption of nitrogen was 0.001 l/hr per 1 kg of the suspension, which is lower than the minimum limit indicated in the claims. The distillation process was accomplished at a temperature of 200° C. and at pressure of $5 \cdot 10^4$ n/m$^2$.

The obtained furnace fuel oil had the following characteristics:

| | |
|---|---|
| density at a temperature of 20° C., g/cm$^3$ | 0.9013 |
| Engler viscosity at a temperature of 50° C., °F. | 5.4 |
| ash content, % by mass | 0.1 |
| content of mechanical admixtures, % by mass | 0.2 |
| flash point (in a closed crucible), °C. | 26 |
| heat of combustion, kcal/kg | 9868 |

With the above production conditions the furnace fuel oil has a low flash point, which decreases the quality of the product. In addition, it is not economically feasible to carry out the production process with the above conditions since the great amount of the hydrocarbonaceous solvent in the reaction mixture involves high heat expenses. Also, the productivity in this case is very low because a low consumption of the raw material.

EXAMPLE 16 (negative)

The furnace fuel oil was produced substantially as described in Example 2 using the same raw material and the same hydrocarbonaceous solvent which was preliminarily heated to a temperature of 140° C., which is lower than the minimum limit indicated in the claims. The waste was mixed with the heated solvent in a ratio of 1:4.3 parts by mass. The thermal decomposition was carried out for 0.5 sec, which is lower than the minimum limit indicated in the claims, at a temperature of 140° C., which is also lower than the minimum limit indicated in the claims and at a pressure of $4 \cdot 10^2$ n/m$^2$. Such being the case, the hydrocarbonaceous solvent intensively circulated through the reaction mixture at a rate of 8 l/hr per 1 kg of the waste. The distillation process was carried out at a temperature of 361° C. and a pressure of $1.5 \cdot 10^3$ n/m$^2$.

The obtained furnace fuel oil had the following characteristics:

| | |
|---|---|
| density at a temperature of 20° C., g/cm$^3$ | 0.9901 |
| Engler viscosity at a temperature of 50° C., °F. | 19.7 |
| ash content, % by mass | 4.1 |
| content of mechanical admixtures, % by mass | 3.9 |
| flash point (in a closed crucible), °C. | 78 |
| heat of combustion, kcal/kg | 9912 |

With the above production conditions the furnace fuel oil contains a comparatively high amount of mechanical admixtures and ash, which impairs its quality.

In addition the raw material has no time to dissolve in the course of the thermal decomposition and should undergo repeated thermal decomposition, which considerably decreases the productivity and increases consumption of energy.

EXAMPLE 17 (negative)

The furnace fuel oil was produced substantially as described in Example 2 using the same raw material and the same hydrocarbonaceous solvent. The hydrocarbonaceous solvent was preliminarily heated up to a temperature of 445° C. The waste was mixed with the hydrocarbonaceous solvent in a ratio of 1:4.7 parts by mass. The thermal destruction was carried out for 125 sec at a temperature of 445° C. and at a pressure of $13 \cdot 10^5$ n/m$^2$. This being the case, the hydrocarbonaceous solvent intensively circulated through the reaction mixture at a rate of 35 l/hr per 1 kg of the waste, which exceeds the maximum limit indicated in the claims. The distillation process was carried out with the use of stack gases as an inert gaseous agent. The consumption of stack gases was 21 l/hr per 1 kg of the suspension. The process was accomplished at a temperature of 470° C. and at a pressure of $2 \cdot 10^5$ n/m$^2$, which exceeds the maximum limit indicated in the claims.

The obtained furnace fuel oil had the following characteristics:

| | |
|---|---|
| density at a temperature of 20° C., g/cm$^3$ | 0.9712 |
| Engler viscosity at a temperature of 50° C., °F. | 10.3 |
| ash content, % by mass | 3.1 |
| content of mechanical admixtures, % by mass | 2.7 |
| flash point (in a closed crucible), °C. | 24 |
| heat of combustion, kcal/kg | 9814 |

With the above production conditions the furnace fuel oil has a low flash point, an increased content of mechanical admixtures and ash content, which impairs its quality.

In addition, the excessive circulation of the hydrocarbonaceous solvent requires higher consumption of energy.

EXAMPLE 18 (negative)

The furnace fuel oil was produced substantially as described in Example 2 using the same raw material and the same hydrocarbonaceous solvent. The hydrocarbonaceous solvent was preliminarily heated up to a temperature of 293° C. The waste was mixed with the heated solvent in a ratio of 1:5.5 parts by mass. The thermal destruction was carried out for 184 sec at a temperature of 293° C. and at a pressure of $4 \cdot 10^4$ n/m$^2$. This being the case, the hydrocarbonaceous solvent circulated through the reaction mixture at a rate of 0.5 l/hr per 1 kg of the waste, which is lower than the minimum limit indicated in the claims. The distillation process was carried out at a temperature of 300° C. and at a pressure of $5 \cdot 10^4$ n/m$^2$ with the use of nitrogen as an inert gaseous agent. The consumption of nitrogen was 15 l/hr per 1 kg of the suspension.

The obtained furnace fuel oil had the following characteristics:

| | |
|---|---|
| density at a temperature of 20° C., g/cm³ | 0.8794 |
| Engler viscosity at a temperature of 50° C., °E. | 10.13 |
| ash content, % by mass | 4.3 |
| content of mechanical admixtures, % by mass | 1.3 |
| flash point (in a closed crucible), °C. | 163 |
| heat of combustion, kcal/kg | 9963 |

With the above production conditions the furnace fuel oil has an increased content of mechanical admixtures and an increased content of ash, which impairs its quality.

In addition, at the above rate of circulation of the hydrocarbonaceous solvent in the course of the thermal decomposition of the raw material there are formed dead spaces, which causes coking of said raw material.

EXAMPLE 19

The softener for rubber mixtures according to the invention was produced from a waste based on butadiene natural rubber. In doing so, the hydrocarbonaceous solvent described in Example 7 was preheated up to a temperature of 391° C. and then mixed with the above waste. The ratio of the waste and the hydrocarbonaceous solvent in the reaction mixture was 1:11.7 of parts by mass.

The thermal decomposition was carried out for 254 sec at a temperature of 391° C. and at a pressure of $3.7 \cdot 10^5$ n/m², the hydrocarbonaceous solvent intensively circulating through the reaction mixture at a rate of 2.5 l/hr per 1 kg of the waste.

From the obtained suspension the softener was separated by distillation at a temperature of 302° C. and at a pressure of $2.4 \cdot 10^4$ n/m². In the course of the distillation process the remainder of sulphur dioxide was removed by an inert gaseous agent, namely ethane. The consumption of ethane was 2.1 l/hr per 1 kg of the suspension.

The obtained softener for rubber mixtures had the following characteristics:

| | |
|---|---|
| density at a temperature of 20° C., g/cm³ | 0.9249 |
| kinematic viscosity at a temperature of 100° C. | 6.5 |
| viscosity index | 183 |
| distillation fractions, °C.: | |
| beginning of boiling | 312 |
| 50% boils away | 401 |
| end of boiling | 480 |
| molecular mass | 373 |
| content of sulphur, % by mass | 0.35 |
| congelation temperature, °C. | −46 |

The viscosity index and the congelation temperature were determined in accordance with the following procedures.

The viscosity index of an oil product (softener for rubber mixtures) characterizes the dependence of the viscosity of the product within the temperature range generally accepted for the measurement of viscosity. The viscosity index is determined from a nomogram where values of viscosity are plotted at temperatures of 50° and 100° C. on the coordinate axis, and the inclined lines correspond to the viscosity index within the range of 40 to 200. The viscosity indexes were determined by drawing perpendiculars to the coordinate axis from the points which correspond to the viscosities of the softener being tested at temperatures of 50° and 100° C. The point of intersection of the perpendiculars with the inclined lines represented the value of the viscosity index.

The procedure of determining the congelation temperature of an oil product (softener for rubber mixtures) was the following. A softener was placed into a test glass and subjected therein to a thermal treatment, i.e. was heated up to a temperature at which solid resinous substances and crystals of paraffin melt or dissolve partially or completely. Then the heated softener was cooled by a cooling mixture down to the hypothetical temperature of congelation. At this temperature the test glass with the softener was installed at an angle of 45° C., and the level of the softener was observed. Irrespective of the fact whether the level of the softener shifted or remained immobile the testing procedure was repeated from the very beginning, including the thermal treatment, whereupon the softener was cooled down to a higher or lower temperature. Thus the highest temperature was found at which the level of the softener in the test glass inclined at an angle of 45° remained immobile for a certain period of time. This temperature was accepted as the congelation temperature of a softener for rubber mixtures.

With the aid of the softener there were produced vulcanizates based on butadiene-nitrile rubber. The amount of the softener per 100 parts by mass of the rubber was 12 parts by mass.

The obtained vulcanizate had the following physical and mechanical properties:

| | |
|---|---|
| hardness | 62 |
| rebound resilience at a temperature of 20° C., % | 36 |
| tensile strength, kgf/cm² | 300 |
| relative elongation at rupture, % | 709 |
| permanent elongation after rupture, % | 15 |
| heat ageing coefficient after 5 days at a temperature of 100° C.: | |
| by the tensile strength | 1.0 |
| by the relative elongation | 0.82 |
| ripping resistance, kgf/cm | 71 |
| brittleness temperature, °C. | −57 |

The hardness of the vulcanizate specimens was determined in accordance with the immersion of a standard size needle acted upon by a calibrated spring. The specimens were 6 mm thick washers which were 50 mm in diameter. The washers were tested at least at three points, and the arithmetic mean of all the results of testing was considered to be the hardness of the specimen.

The rebound resilience was determined by way of an impact of a pendulum head falling from a certain height against the specimen being tested. The specimens were 50 mm in diameter and 6 mm thick washers. The specimen was tested at least at three points. The distances among these points as well as the distances from each point to the edge of the washer was not less than 10 mm. The tests were carried out at a temperature of 20° C. To determine the rebound resilience, there was taken the index after the fourth impact of the pendulum head against the specimen at a given point. The rebound resiliency was determined by the formula:

$$R = W_1/W = h_1/h \; 100\%$$

where

W=mgh energy spent for deformation of the specimen after the impact by the pendulum head falling from the height h;

$W_1 = mgh_1$ returned energy bringing the pendulum head back to the height $h_1$.

The tensile strength was determined by the value of the load at the moment of rupture related to the unit of the initial cross-section of the specimen. The specimens to be tested were 2 mm thick blades. The tensile strength was determined by the formula:

$$f = P/S_0,$$

where f = tensile strength, kgf/cm$^2$;
P = load causing the rupture of the specimen, kgf;
$S_0 = b_0 \cdot h_0$—initial area of the cross-section of the specimen, cm$^2$;
$b_0$ = initial width of the specimen, cm;
$h_0$ = initial thickness of the specimen, cm;

The relative elongation at rupture was determined by the formula:

$$\epsilon = l_1 - l_0/l_0 \, 100,$$

where $\epsilon$ = relative elongation at rupture, %;
$l_1$ = length of the working portion of the specimen at the moment of rupture, mm;
$l_0$ = initial length of the working portion of the specimen, mm.

The permanent elongation after rupture was determined by the formula:

$$\theta = l_2 - l_0/l_0 \, 100,$$

where $\theta$ = permanent elongation after rupture, %;
$l_2$ = length of the working portion of the specimen by the two ruptured specimen portions put together, mm;
$l_0$ = initial length of the working portion of the specimen; mm;

The heat ageing was determined by the change of properties of the vulcanizate specimens prior to and after the ageing. The specimens were tested to determine the tensile strength and the relative elongation at rupture. The specimens were subjected to ageing for 5 days at a temperature of 100° C. The heat ageing coefficient was determined by the formula:

$$K = O - A/O \, 100,$$

where

K = heat ageing coefficient, %;
O = average value of the index characterizing the property of the specimen prior to ageing;
A = average value of the index characterizing the property of the specimen after ageing.

The ripping resistance was determined by ripping the vulcanize specimen. In doing so, the load at which the specimen broke was noted. The specimens to be tested had incisions in the middle of the internal side. The incisions were made at a right angle to the plane of the specimen. The edges of the specimen were secured in clamps of a ripping machine and the specimen was stretched.

The ripping resistance was determined by the formula:

$$B = P_p/h_0$$

where

B = ripping resistance, kgf/cm;
$P_p$ = maximum force, kfg;
$h_0$ = initial thickness of the specimen, cm.

To determine the brittleness temperature, there were used 25 mm long, 6.5 mm wide, 2 mm thick specimens in the form of strips. 10-15 similar specimens were subjected to freezing. The highest temperature at which two specimens became brittle, i.e. cracked or broke when subjected to an impact load.

The above data show that the obtained vulcanizate with the use of the softener for rubber mixtures, produced according to the method of the present invention possesses better characteristics than those of conventional vulcanizates and is less costly.

EXAMPLE 20

The softener for rubber mixtures according to the invention was produced substantially as described in Example 19. The raw material was resin waste based on butadiene-styrene rubber.

The hydrocarbonaceous solvent had such characteristics as those described in Example 7.

Said hydrocarbonaceous solvent was preheated up to a temperature of 200° C., whereupon it was mixed with the waste. The ratio of the waste and the hydrocarbonaceous solvent in the reaction mixture was 1:100 parts by mass. The thermal decomposition was carried out for 254 sec at a temperature of 200° C. and at a pressure of $1 \cdot 10^5$ n/m$^2$, the hydrocarbonaceous solvent intensively circulating through the reaction mixture at a rate of 2.5 l/hr per 1 kg of the waste. From the obtained suspension the obtained softener was separated by distillation at a temperature of 200° C. and at a pressure of $1 \cdot 10^3$ n/m$^2$.

In the course of the distillation process the remainder of sulphur dioxide was removed by an inert gaseous agent, namely nitrogen. The consumption of nitrogen was 14 l/hr per 1 kg of the suspension.

The obtained softener had the following characteristics:

| | |
|---|---|
| density at a temperature of 20° C., g/cm$^3$ | 0.9526 |
| kinematic viscosity at a temperature of 100° C., cSt | 7.9 |
| viscosity index | 145 |
| distillation fractions, °C.: | |
| beginning of boiling | 350 |
| 50% boils away | 410 |
| end of boiling | 450 |
| molecular mass | 356 |
| content of sulphur, % by mass | 1.3 |
| congelation temperature, °C. | −40 |

With the aid of the obtained softener there were produced vulcanizates based on butadiene-nitrile rubber. The softener was taken in an amount of 5 parts by mass per 100 parts by mass of rubber. The obtained vulcanizate had the following physical and mechanical properties:

| | |
|---|---|
| hardness | 66 |
| rebound resilience at a temperature of 20° C., % | 31 |
| tensile strength, kgf/cm$^2$ | 302 |
| relative elongation at rupture, % | 551 |
| permanent elongation after rupture, % | 11 |
| heat ageing coefficient for 5 days at a | |

-continued

| | |
|---|---|
| temperature of 100° C.: | |
| by the tensile strength, % | 0.98 |
| by the relative elongation, % | 0.66 |
| ripping resistance, kgf/cm | 66 |
| brittleness temperature, °C. | −53 |

The properties and the cost of the obtained vulcanizate were similar to those of the vulcanizate produced as described in Example 19.

EXAMPLE 21

The softener for rubber mixtures according to the invention was produced substantially as described in Example 19. The raw material was resin waste based on butadiene-styrene rubber. The characteristics of the hydrocarbonaceous solvent were similar to those described in Example 7. Said hydrocarbonaceous solvent was preheated to a temperature of 400° C., whereupon it was mixed with the waste. The ratio of the waste and the hydrocarbonaceous solvent in the reaction mixture was 1:1 parts by mass. The thermal decomposition was carried out for 250 sec at a temperature of 400° C. and at a pressure of $4 \cdot 10^5$ n/m², the hydrocarbonaceous solvent continuously circulating through the reaction mixture at a rate of 3 l/hr per 1 kg of the waste.

From the obtained suspension the softener was separated by distillation at a temperature of 400° C. and at a pressure of $2 \cdot 10^5$ n/m².

In the course of the distillation process the remainder of sulphur dioxide was removed by an inert gaseous agent, namely nitrogen. The consumption of nitrogen was 10 l/hr per 1 kg of the suspension.

The obtained softener had the following characteristics:

| | |
|---|---|
| density at a temperature of 20° C., g/cm³ | 0.9545 |
| kinematic viscosity at a temperature of 100° C., cSt | 12.3 |
| viscosity index | 96 |
| distillation fractions, °C.: | |
| beginning of boiling | 403 |
| 50% boils away | 436 |
| end of boiling | 498 |
| molecular mass | 398 |
| content of sulphur, % by mass | 1.2 |
| congelation temperature, °C. | −38 |

With the aid of the obtained softener there were produced vulcanizates based on butadiene-nitrile rubber. The softener was taken in an amount of 10 parts by mass per 100 parts by mass of rubber. The obtained vulcanizate had the following physical and mechanical properties:

| | |
|---|---|
| hardness | 65 |
| rebound resilience at a temperature of 20° C., % | 33 |
| tensile strength, kgf/cm² | 308 |
| relative elongation at rupture, % | 605 |
| permanent elongation after rupture, % | 13 |
| heat ageing coefficient after 5 days of ageing at a temperature of 100° C.: | |
| by the tensile strength, kgf/cm² | 0.99 |
| by the relative elongation, % | 0.72 |
| ripping resistance, kgf/cm | 67 |
| brittleness temperature, °C. | −54 |

The properties and the cost of the obtained vulcanizate were similar to those of the vulcanizate produced as described in Example 19.

EXAMPLE 22

The softener for rubber mixtures according to the invention was produced substantially as described in Example 19. The raw material was resin waste based on ethylene-propylene isoprene rubber. The characteristics of the hydrocarbonaceous solvent were similar to those described in Example 8. Said hydrocarbonaceous solvent was preheated up to a temperature of 395° C., whereupon it was mixed with the waste. The ratio of the waste and the hydrocarbonaceous solvent in the reaction mixture was 1:11.5 parts by mass. The thermal decomposition was carried out for 225 sec at a temperature of 395° C. and at a pressure of $3.5 \cdot 10^5$ n/m², the hydrocarbonaceous solvent intensively circulating through the reaction mixture at a rate of 1.3 l/hr per 1 kg of the waste. From the obtained suspension the softener was separated by distillation at a temperature of 306° C. and at a pressure of $8.1 \cdot 10^4$ n/m². In the course of the distillation process the remainder of sulphur dioxide was removed by an inert gaseous agent, namely stack gases. The consumption of stack gases was 2.4 l/hr per 1 kg of the suspension.

The obtained softener had the following characteristics:

| | |
|---|---|
| density at a temperature of 20° C., g/cm³ | 0.9318 |
| kinematic viscosity at a temperature of 100° C., cSt | 6.7 |
| viscosity index | 176 |
| distillation fractions, °C.: | |
| beginning of boiling | 323 |
| 50% boils away | 408 |
| end of boiling | 483 |
| molecular mass | 376 |
| content of sulphur, % by mass | 0.43 |
| congelation temperature, °C. | −45 |

With the aid of the obtained softener there were produced vulcanizates based on butadiene-nitrile rubber. The softener was taken in an amount of 12 parts by mass per 100 parts by mass of rubber. The obtained vulcanizate had the following physical and mechanical properties:

| | |
|---|---|
| hardness | 65 |
| rebound resilience at a temperature of 20° C., % | 35 |
| tensile strength, kgf/cm² | 304 |
| relative elongation at rupture, % | 702 |
| permanent elongation after rupture, % | 14 |
| heat ageing coefficient after ageing for 5 days at a temperature of 100° C.: | |
| by the tensile strength, % | 1.0 |
| by the relative elongation, % | 0.80 |
| ripping resistance, kfg/cm | 72 |
| brittleness temperature, °C. | −56 |

The properties and the cost of the obtained vulcanizate were similar to those of the vulcanizate produced as described in Example 19.

EXAMPLE 23

The softener for rubber mixtures according to the invention was produced substantially as described in Example 19. The raw material was resin waste based on butadiene-styrene rubber. The hydrocarbonaceous solvent had the following characteristics:

| | |
|---|---|
| density at a temperature of 20° C., g/cm³ | 0.7663 |
| index of refraction, $n_D^{20}$ | 1.4325 |

| | |
|---|---|
| Engler viscosity at a temperature of 50° C., °E | 0.3 |
| molecular mass | 141 |
| distillation fractions, °C.: | |
| beginning of boiling | 50 |
| 50% boils away | 165 |
| end of boiling | 250 |
| content of sulphur, % by mass | 0.12 |
| group chemical composition, % by mass: | |
| methano-naphthenic hydrocarbons, % by mass | 69.8 |
| monocyclic aromatic hydrocarbons | 20.3 |
| bicyclic aromatic hydrocarbons | 8.4 |
| polycyclic aromatic hydrocarbons | 1.5 |

Said hydrocarbonaceous solvent was preheated to a temperature of 398° C., whereupon it was mixed with the waste. The ratio of the waste and the hydrocarbonaceous solvent in the reaction mixture was 1:12.3 parts by mass.

The thermal decomposition was carried out for 282 sec at a temperature of 398° C. and at a pressure of $3.1 \cdot 10^5$ n/m$^2$, the hydrocarbonaceous solvent continuously circulating through the reaction mixture at a rate of 1.7 l/hr per 1 kg of the waste.

From the obtained suspension the softener was separated by distillation at a temperature of 304° C. and at a pressure of $5.7 \cdot 10^3$ n/m$^2$. In the course of the distillation process the remainder of sulphur dioxide was removed by an inert gaseous agent, namely steam. The consumption of steam was 1.3 l/hr per 1 kg of the suspension.

The obtained softener had the following characteristics:

| | |
|---|---|
| density at a temperature of 20° C., g/cm$^3$ | 0.9506 |
| kinematic viscosity at a temperature of 100° C., cSt | 8.6 |
| viscosity index | 148 |
| distillation fractions, °C.: | |
| beginning of boiling | 345 |
| 50% boils away | 412 |
| end of boiling | 498 |
| molecular mass | 382 |
| content of sulphur, % by mass | 0.51 |
| congelation temperature, °C. | −42 |

With the aid of the obtained softener there were produced vulcanizates based on butadiene-nitrile rubber. The softener was taken in an amount of 12 parts by mass per 100 parts by mass of rubber. The obtained vulcanizate had the following physical and mechanical properties:

| | |
|---|---|
| hardness | 67 |
| rebound resilience at a temperature of 20° C., % | 34 |
| tensile strength, kgf/cm$^2$ | 301 |
| relative elongation at rupture, % | 685 |
| permanent elongation after rupture, % | 12 |
| heat ageing coefficient after ageing for 5 days at a temperature of 100° C.: | |
| by the tensile strength, % | 0.98 |
| by the relative elongation, % | 0.72 |
| ripping resistance, kgf/cm | 73 |
| brittleness temperature, °C. | −54 |

The properties and the cost of the obtained vulcanizate were similar to those of the vulcanizate produced as described in Example 19.

EXAMPLE 24

The softener for rubber mixtures according to the invention was produced substantially as described in Example 19. The raw material was resin waste based on ethylene-propylene acryl rubber. The hydrocarbonaceous solvent had the characteristics described in Example 7.

Said hydrocarbonaceous solvent was preheated to a temperature of 392° C., whereupon it was mixed with the waste. The ratio of the waste and the hydrocarbonaceous solvent in the reaction mixture was 1:11.2 parts by mass.

The thermal decomposition process was carried out for 293 sec at a temperature of 392° C. and at a pressure of $3.1 \cdot 10^5$ n/m$^2$, the hydrocarbonaceous solvent continuously circulating through the reaction mixture at a rate of 1.4 l/hr per 1 kg of the waste.

From the obtained suspension the softener was separated by distillation at a temperature of 301° C. and at a pressure of $5.4 \cdot 10^3$ n/m$^2$. In the course of the distillation process the remainder of sulphur dioxide was removed by an inert gaseous agent, namely propane. The consumption of propane was 2.5 l/hr per 1 kg of the suspension.

The obtained softener had the following characteristics:

| | |
|---|---|
| density at a temperature of 20° C., g/cm$^3$ | 0.322 |
| kinematic viscosity at a temperature of 100° C., cSt | 6.8 |
| viscosity index | 179 |
| distillation fractions, °C.: | |
| beginning of boiling | 326 |
| 50% boils away | 409 |
| end of boiling | 485 |
| molecular mass | 374 |
| content of sulphur, % by mass | 0.48 |
| congelation temperature, °C. | −43 |

With the aid of the obtained softener there were produced vulcanizates based on butadiene-nitrile rubber. The softener was taken in an amount of 12 parts by mass per 100 parts by mass of rubber. The obtained vulcanizate had the following physical and mechanical properties:

| | |
|---|---|
| hardness | 64 |
| rebound resilience at a temperature of 20° C., % | 35 |
| tensile strength, kgf/cm$^2$ | 310 |
| relative elongation at rupture, % | 694 |
| permanent elongation after rupture, % | 14 |
| heat ageing coefficient after the ageing of the vulcanizate for 5 days at a temperature of 100° C.: | |
| by the tensile strength, % | 0.99 |
| by the relative elongation, % | 0.75 |
| ripping resistance, kgf/cm | 70 |
| brittleness temperature, °C. | −56 |

The properties and the cost of the obtained vulcanizate were similar to those of the vulcanizate produced as described in Example 19.

EXAMPLE 25

The softener for rubber mixtures according to the invention was produced substantially as described in Example 19. The raw material was resin waste based on ethylene-propylene rubber. The hydrocarbonaceous solvent had the characteristics described in Example 23.

Said hydrocarbonaceous solvent was preheated to a temperature of 394° C., whereupon it was mixed with the waste. The ratio of the waste and the hydrocarbonaceous solvent in the reaction mixture was 1:11.1 parts by mass. The thermal decomposition process was carried out for 275 sec at a temperature of 394° C. and at a pressure of $3.2 \cdot 10^5$ n/m², the hydrocarbonaceous solvent continuously circulating through the reaction mixture at a rate of 2.3 l/hr per 1 kg of the waste.

From the obtained suspension the softener was separated by distillation at a temperature of 275° C. and at a pressure of $3.1 \cdot 10^3$ n/m². In the course of the distillation process the remainder of sulphur dioxide was removed by an inert gaseous agent, namely steam. The consumption of steam was 2.7 l/hr per 1 kg of the suspension.

The obtained softener had the following characteristics:

| | |
|---|---|
| density at a temperature of 20° C., g/cm³ | 0.9123 |
| kinematic viscosity at a temperature of 100° C., cSt | 4.9 |
| viscosity index | 194 |
| distillation fractions, °C.: | |
| beginning of boiling | 301 |
| 50% boils away | 395 |
| end of boiling | 463 |
| molecular mass | 369 |
| content of sulphur, % by mass | 0.28 |
| congelation temperature, °C. | −56 |

With the aid of the obtained softener there were produced vulcanizates based on butadiene-nitrile rubber. The softener was taken in an amount of 10 parts by mass per 100 parts by mass of rubber. The obtained vulcanizate had the following physical and mechanical properties:

| | |
|---|---|
| hardness | 61 |
| rebound resilience at a temperature of 20° C., % | 39 |
| tensile strength, kgf/cm² | 308 |
| relative elongation at rupture, % | 727 |
| permanent elongation after rupture, % | 16 |
| heat ageing coefficient of the vulcanizate after the ageing of the latter for 5 days at a temperature of 100° C.: | |
| by the tensile strength, % | 0.96 |
| by the relative elongation, % | 0.84 |
| ripping resistance, kgf/cm | 74 |
| brittleness temperature, °C. | −59 |

The properties and the cost of the obtained vulcanizate were similar to those of the vulcanizate produced in accordance with Example 19.

EXAMPLE 26 (negative)

A softener for rubber mixtures was produced substantially as described in Example 19. The raw material was resin waste based on ethylene-propylene rubber. The hydrocarbonaceous solvent had the characteristics described in Example 23.

Said hydrocarbonaceous solvent was preheated up to a temperature of 410° C., whereupon it was mixed with the waste. The ratio of the waste and the hydrocarbonaceous solvent in the reaction mixture was 1:11.2 parts by mass. The thermal decomposition process was carried out for 272 sec at a temperature of 410° C. and at a pressure of $4.5 \cdot 10^5$ n/m², which exceeds the maximum limits indicated in the claims, the hydrocarbonaceous solvent continuously circulating through the reaction mixture at a rate of 2.5 l/hr per 1 kg of the waste.

From the obtained suspension the softener was separated by distillation at a temperature 410° C. and at a pressure of $2.5 \cdot 10^5$ n/m², which also exceeds the maximum limits indicated in the claims. In the course of the distillation process the remainder of sulphur dioxide was removed by an inert gaseous agent, namely steam. The consumption of steam was 2.7 l/hr per 1 kg of the suspension.

The obtained softener had the following characteristics:

| | |
|---|---|
| density at a temperature of 20° C., g/cm³ | 0.9015 |
| kinematic viscosity at a temperature of 100° C., cSt | 0.6 |
| viscosity index | 61 |
| distillation fractions, °C.: | |
| beginning of boiling | 154 |
| 50% boils away | 315 |
| end of boiling | 407 |
| molecular mass | 265 |
| content of sulphur, % by mass | 0.69 |
| congelation temperature, °C. | −57 |

With the above production conditions the viscosity-and-temperature properties of the softener become worse and the content of sulphur therein higher, which reduces the quality of the same softener for rubber mixtures.

EXAMPLE 27 (negative)

A softener for rubber mixtures was produced substantially as described in Example 19. The raw material was resin waste based on isoprene rubber. The hydrocarbonaceous solvent had the characteristics described in Example 6.

Said hydrocarbonaceous solvent was preheated up to a temperature of 190° C., whereupon it was mixed with the waste. The ratio of the waste and the hydrocarbonaceous solvent in the reaction mixture was 1:11.3 parts by mass. The thermal decomposition process was carried out for 300 sec at a temperature of 190° C. and at a pressure of $0.5 \cdot 10^5$ n/m², which is lower than the minimum limits indicated in the claims, the hydrocarbonaceous solvent continuously circulating through the reaction mixture at a rate of 1.9 l/hr per 1 kg of the waste.

From the obtained suspension the softener was separated by distillation at a temperature of 190° C. and at a pressure of $0.5 \cdot 10^3$ n/m², which is also lower than the minimum limits indicated in the claims. In the course of the distillation process the remainder of sulphur dioxide was removed by an inert gaseous agent, namely steam. The consumption of steam was 3.1 l/hr per 1 kg of the suspension.

The obtained softener had the following characteristics:

| | |
|---|---|
| density at a temperature of 20° C., g/cm³ | 0.9982 |
| kinematic viscosity at a temperature of 100° C., cSt | 19.9 |
| viscosity index | 23 |
| distillation fractions, °C.: | |
| beginning of boiling | 228 |
| 50% boils away | 495 |
| end of boiling | 570 |
| molecular mass | 498 |
| sulphur content, % by mass | 0.93 |
| congelation temperature, °C. | +1 |

With the above production conditions of the softener the viscosity and temperature properties thereof are worse, the content of sulphur therein is higher, and the congelation temperature thereof is higher as well. This reduces the quality of the obtained softener for rubber mixtures.

While particular embodiments of the invention have been shown and described, various modifications thereof will be apparent to those skilled in the art and therefore it is not intended that the invention be limited to the disclosed embodiments or to the details thereof and the departures may be made therefrom within the spirit and scope of the invention as defined in the claims.

What is claimed is:

1. A method of making either a softener for rubber mixtures or a furnace fuel oil, comprising the steps of:
    a. heating to a temperature of from 150° to 600° C. a hydrocarbonaceous solvent selected from the group consisting of oil fractions having boiling temperatures of 40° to 120° C., 50° to 250° C., 250° to 400° C. and 200° to 500° C., coke-chemical fractions having boiling temperatures of 320° to 535° C., and furnace fuel oils produced according to the presently claimed method;
    b. adding vulcanized or, olefinically unsaturated non-vulcanized waste rubber to said heated hydrocarbonaceous solvent under intensive stirring, wherein said waste rubber is added to said hydrocarbonaceous solvent in a ratio of 1:1 to 1:100 parts by mass;
    c. thermally decomposing said waste rubber at a pressure of $5 \cdot 10^2$ to $25 \cdot 10^5$ n/m$^2$ and at a temperature of 150° to 485° C. for 1 to 300 seconds, said hydrocarbonaceous solvent continuously circulating through the reaction mixture at a rate of 1 to 30 l/hr per 1 kg of the waste rubber; and
    d. separating the end product from the formed suspension by distillation at a temperature of 200° to 560° C. and at a pressure of 10 to $2 \cdot 10^5$ n/m$^2$ in the presence of an inert gaseous agent.

2. A method as claimed in claim 1, wherein used as the inert gaseous agent are nitrogen, steam, stack gases, methane, ethane, propane, hydrocarbonaceous $C_3$–$C_6$ fraction or mixtures thereof.

3. A method as claimed in claim 1, wherein in the course of the distillation the inert gaseous agent is continuously fed at a rate of 0.01 to 90 l/hr per 1 kg of the suspension.

4. A method as claimed in claim 1, wherein in the course of making the furnace fuel oil the distillation process is carried out at a temperature of 250° to 560° C. and at a pressure of 10 to $1 \cdot 10^5$ n/m$^2$.

5. A method as claimed in claim 4, wherein in the course of the thermal decomposition of said waste said hydrocarbonaceous solvent contains from 0.1 to 100% by mass of aromatic hydrocarbons and resins.

6. A method as claimed in claim 1, wherein in the course of making the softener for rubber mixtures the thermal decomposition of said waste is carried out at a temperature of 200° to 400° C. and at a pressure of $1 \cdot 10^5$ to $4 \cdot 10^5$ n/m$^2$, and in the distillation process the temperature is maintained within the range of 200° to 400° C. and the pressure, within the range of $1 \cdot 10^3$ to $2 \cdot 10^5$ n/m$^2$.

* * * * *